United States Patent
Kleismit et al.

(10) Patent No.: US 7,501,833 B2
(45) Date of Patent: Mar. 10, 2009

(54) EVANESCENT MICROWAVE MICROSCOPY PROBE AND METHODOLOGY

(75) Inventors: Richard A. Kleismit, Brookville, OH (US); Gregory Kozlowski, Springboro, OH (US)

(73) Assignee: Wright State University, Dayton, OH (US)

( * ) Notice: Subject to any disclaimer, the term of this patent is extended or adjusted under 35 U.S.C. 154(b) by 133 days.

(21) Appl. No.: 11/484,092

(22) Filed: Jul. 11, 2006

(65) Prior Publication Data

US 2007/0069741 A1    Mar. 29, 2007

Related U.S. Application Data

(63) Continuation-in-part of application No. 11/255,497, filed on Oct. 20, 2005.

(60) Provisional application No. 60/620,592, filed on Oct. 20, 2004.

(51) Int. Cl.
  *G01R 27/04* (2006.01)
  *G01R 27/32* (2006.01)
(52) U.S. Cl. .................... 324/637; 324/633
(58) Field of Classification Search ........... 324/637, 324/633
See application file for complete search history.

(56) References Cited

U.S. PATENT DOCUMENTS

| | | |
|---|---|---|
| 6,532,806 B1 | 3/2003 | Xiang et al. |
| 6,680,617 B2 | 1/2004 | Moreland et al. |
| 2004/0226351 A1 | 11/2004 | Schafrik et al. |

OTHER PUBLICATIONS

Kleismit et al., Evanescent Microwave Microscopy of Thermally-Damaged Charge Coupled Devices, Electrical Insulation Conference and Electrical Manufacturing Technology Conference, 2003, Proceedings p. 485-488.*

Kleismit et al, "Local dielectric and strain measurements in $YBa_2Cu_3O_{7-\delta}$ thin films by evanescent microscopy and Raman spectroscopy" 2005 IOP Publishing Ltd, Supercond. Sci. Technol. 18 (2005) 1197-1203.

Anlage et al, "Near-Field Microwave Microscopy of Materials Properties" arXiv:cond-mat/0001075 v2 Apr. 18, 2000, pp. 1-31.

Gao et al, "Quantitative microwave near-field microscopy of dielectric properties" 1998 American Institute of Physics, Review of Scientific Instruments, vol. 69, No. 11, Nov. 1998, pp. 3846-3851.

Pozar, David M., "Microwave Engineering" 1990, Addison Wesley Publications, Chapter 1, pp. 19-21, Appendix F.

* cited by examiner

*Primary Examiner*—Diego Gutierrez
*Assistant Examiner*—Amy He
(74) *Attorney, Agent, or Firm*—Dinsmore & Shohl LLP

(57) ABSTRACT

The present invention generally relates to an evanescent microwave spectroscopy probe and methods for making and using the same. Some embodiments relate to a probe in electrical communication with sapphire tuning capacitors that are arranged in parallel. Some embodiments relate to using capacitors arranged in this manner to achieve higher Q values. Furthermore, probe can be used in microwave microscopy applications, and for imaging samples thereby.

20 Claims, 8 Drawing Sheets

EVANESCENT MICROWAVE MICROSCOPY PROBE AND METHODOLOGY

RELATED APPLICATION DATA

This application is a continuation-in-part of, and hereby claims priority to, U.S. patent application Ser. No. 11/255,497 filed on Oct. 20, 2005, pending; which claims priority to U.S. Provisional Patent Application No. 60/620,592 filed on Oct. 20, 2004; all of which are incorporated by reference in their entireties.

BACKGROUND OF THE INVENTION

The present invention relates to probes for imaging evanescent microwave fields. In some embodiments the present invention relates to achieving high Q values by using sapphire capacitors that are arranged in parallel. Additionally, the present invention relates to methods of making and using such probes. Furthermore, some embodiments relate to using such probes for microwave microscopy, and/or for imaging samples thereby.

Prior work in this area used a shunt series combination. Thus, the maximum Q was solely determined by the resistance of the series R-L-C probe equivalent circuit and tuning network. Additionally, prior methods used calculations based on capacitance arising from the gap between a spherical conducting tip and a perfectly conductive sample surface. As a result, such methods do not accurately predict how the probe reacts in the electric field between it and the sample.

In contrast to prevailing methods, the method of the present invention is independent of the electrical properties of the material. Thus, unlike the prior art, the present invention applies equally well to dielectrics, conductors and superconductors. Furthermore, the method of the present invention, as set forth herein, enables the solution of the classical electrodynamic boundary value problem concerning a superconductor modeled as a dielectric having a complex permittivity with a large negative real part, which can be associated with the persistent current. Still further, in some embodiments the resistance is cut by up to about 50% in comparison to prior microwave probes, which results in higher Q values and correspondingly high sensitivity. Thus, the present invention represents a significant advance in the state of the art.

BRIEF SUMMARY OF THE INVENTION

The present invention relates to near field microscopy and, more particularly to an evanescent microwave microscopy probe for use in near field microscopy and methodology for investigating the complex permittivity of a material through evanescent microwave technology. In one embodiment, the probe comprises a low loss, apertured, coaxial resonator that can be tuned over a large bandwidth by a parallel shunt sapphire tuning network. In one embodiment, the transmission line of the probe utilizes high grade paraffin, offering a low loss tangent and a very close dielectric match within the line. A chemically sharpened probe tip extends slightly past the end aperture of the probe and emits a purely evanescent field. The probe is extremely sensitive, achieving Q values in excess of $0.5 \times 10^6$ and a spatial resolution of $1.0 \times 10^{-6}$ meters.

The physical construction of a probe according to the present invention results in a purely evanescent field emanating from its tip. As a result, when a probe of the present invention is used in quantitative microscopy, it is not necessary to use additional hardware and/or a methodology to separate a propagative component from the field. Probes of the present invention also provide an extremely low loss impedance match to standardized equipment. The low loss coaxial resonator of the present invention theoretically has an infinite bandwidth but in practice its bandwidth is governed by its physical length and the source bandwidth. In the present invention the evanescent mode bandwidth is controlled by the aperture diameter, which is quite large compared with state of the art designs.

The probe of the present invention also utilizes a shunt capacitive tuning network characterized by a low equivalent circuit resistance. As a result, the probe of the present invention provides for large resonant frequency selection range and extremely high Q values.

In some embodiments, the present invention relates to an evanescent microwave microscopy probe, comprising: a center conductor having a first end and a second end, wherein the center conductor comprises a waveguide for microwave radiation; a probe tip affixed to the first end of the center conductor, wherein the tip is capable of acquiring a near-field microwave signal from a sample; an outer shield surrounding the center conductor, wherein the center conductor and outer shield are in a generally coaxial relationship, wherein the outer shield has a first end and a second end corresponding to the first and second ends of the center conductor, and wherein the center conductor and outer shield are not in direct contact and thereby form a gap; an insulating material occupying at least a portion of the gap between the center conductor and the outer shield; an aperture located near the tip, wherein the aperture comprises a plate having an inside face and an outside face, wherein the aperture is oriented generally perpendicular to the center conductor, and wherein the aperture comprises a hole that allows the tip to be in microwave communication with a sample; and a tuning network in electronic communication with the second end of the center conductor and with the outer shield, wherein the tuning network comprises a pair of capacitors in a parallel electronic relationship.

The present invention also relates to a process for making a microwave probe comprising: providing a center conductor having a first end and a second end, wherein the center conductor comprises a waveguide for microwave radiation; affixing a probe tip to the first end of the center conductor, wherein the tip is capable of acquiring a near-field microwave signal from a sample; surrounding the center conductor with an outer shield, wherein the center conductor and outer shield are in a generally coaxial relationship, wherein the outer shield has a first end and a second end corresponding to the first and second ends of the center conductor, and wherein the center conductor and outer shield are not in direct contact and thereby form a gap; occupying at least a portion of the gap between the center conductor and the outer shield with an insulating material; providing an aperture located near the tip, wherein the aperture comprises a plate having an inside face and an outside face, wherein the aperture is oriented generally perpendicular to the center conductor, and wherein the aperture comprises a hole that allows the tip to be in microwave communication with a sample; and providing a tuning network in electronic communication with the second end of the center conductor and with the outer shield, wherein the tuning network comprises a pair of capacitors in a parallel electronic relationship.

Further, the present invention relates to a method of detecting a sample using an electromagnetic microwave field comprising: providing an evanescent microwave microscopy probe according to one embodiment of the present invention; obtaining a resonant frequency reference reading from the probe, wherein the probe is substantially decoupled from a sample; placing the probe in electromagnetic microwave communication with the sample; obtaining a resonant frequency reading from the probe; calculating a resonant frequency change relative to the reference reading; and relating the resonant frequency change to one or more properties of the sample.

Still further, the present invention relates to a method for imaging a sample using an electromagnetic microwave field comprising: providing an evanescent microwave microscopy probe according to one embodiment of the present invention; providing an X-Y sample stage, and a sample disposed thereon; obtaining a resonant frequency reference reading from the probe, wherein the probe is substantially decoupled from the sample; placing the probe in electromagnetic microwave communication with the sample at a first position; obtaining a resonant frequency reading from the probe at the first position; moving the probe to a next position; obtaining a resonant frequency reading from the probe at the next position; repeating the preceding two steps as needed; calculating a resonant frequency change at each position relative to the reference reading; and plotting an image of the sample as a function of position and frequency change or a property related to frequency change.

DETAILED DESCRIPTION OF THE INVENTION

The present invention generally relates to a microwave probe for microwave microscopy and to a method of using the same for generating high quality microwave data. More particularly, the apparatus and method of the present invention can be used to take high-precision, low-noise, measurements of material parameters such as permittivity, permeability, and conductivity.

The probe can be used for the characterization of local electromagnetic properties of materials. The resonator-intrinsic, spatial resolution is experimentally demonstrated herein. A first-order estimation of the sensitivity related to the probe tip-sample interaction for conductors, dielectrics, and superconductors is provided. An estimation of the sensitivity inherent to the resonant probe is set forth. The probe is sensitive in a range of theoretically estimated values, and has micrometer-scale resolution.

In the field of evanescent microwave microscopy, the tip of the probe operates in close proximity to the sample, where the tip radius and effective field distribution range are much smaller than the resonator excitation wavelength. The propagating field exciting resonance in the probe can be ignored and the probe tip-sample interaction can be treated as quasi-static. This can be used for localized measurements and images with resolved features governed essentially by the characteristic size of the tip. The field distribution from the probe tip extends outward a short distance, and as the sample enters the near field of the tip, it interacts with the evanescent field, thus perturbing the probe's resonance. This perturbation is linked to the resonant structure of the probe through the air gap coupling capacitance $C_C$ between the tip and the material. This results in the loading of the resonant probe and alters the resonant frequency $f_r$, quality factor Q, and reflection coefficient $S_{11}$ of the resonator.

If the air gap distance from tip to sample is held constant, the $f_r$, Q, and $S_{11}$ variations related to the microwave properties of the sample can be mapped as the probe tip is scanned over the sample. The microwave properties of a material are functions of permittivity $\in$, permeability $\mu$, and conductivity $\sigma$.

Figure 1:
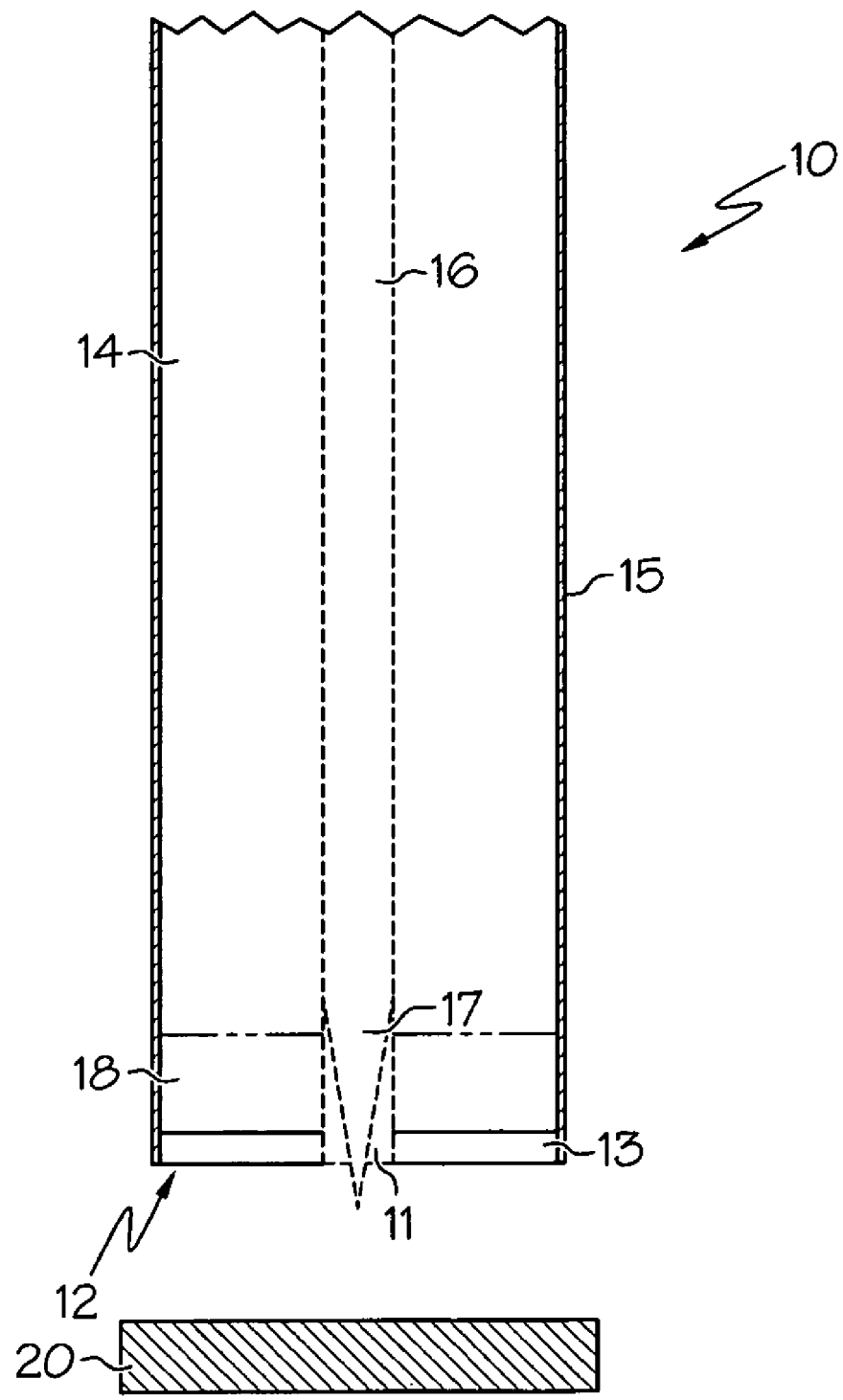
FIG. 1 is a cross-sectional view of a probe in accordance with one embodiment of the present invention.

Referring to FIG. 1, the microwave probe 10 of the present invention can be constructed from a 0.085" semi-ridged coaxial transmission line. The probe 10 is based on an end-wall aperture coaxial transmission line, where the resonator behaves as a series resonant circuit for odd multiples of $\lambda/4$.

In constructing probe 10, the center conductor is removed along with the poly(tetrafluoroethylene) insulator and replaced with, for example, high purity paraffin 14. However, the invention is not restricted to paraffin and alternative materials can be used. For example, alternative materials within the scope of the present invention include, without limitation, magnesium oxide, titanium oxide, boron nitride, aluminas. Other waveguide materials include copper, aluminum, brass, alum, and any combination thereof. Still other wave guide materials include polytetrafluoroethylene (PTFE), PTFE/glass fabrics such as Taconic RF-35, and various organic polymeric materials and composites.

Figure 3:
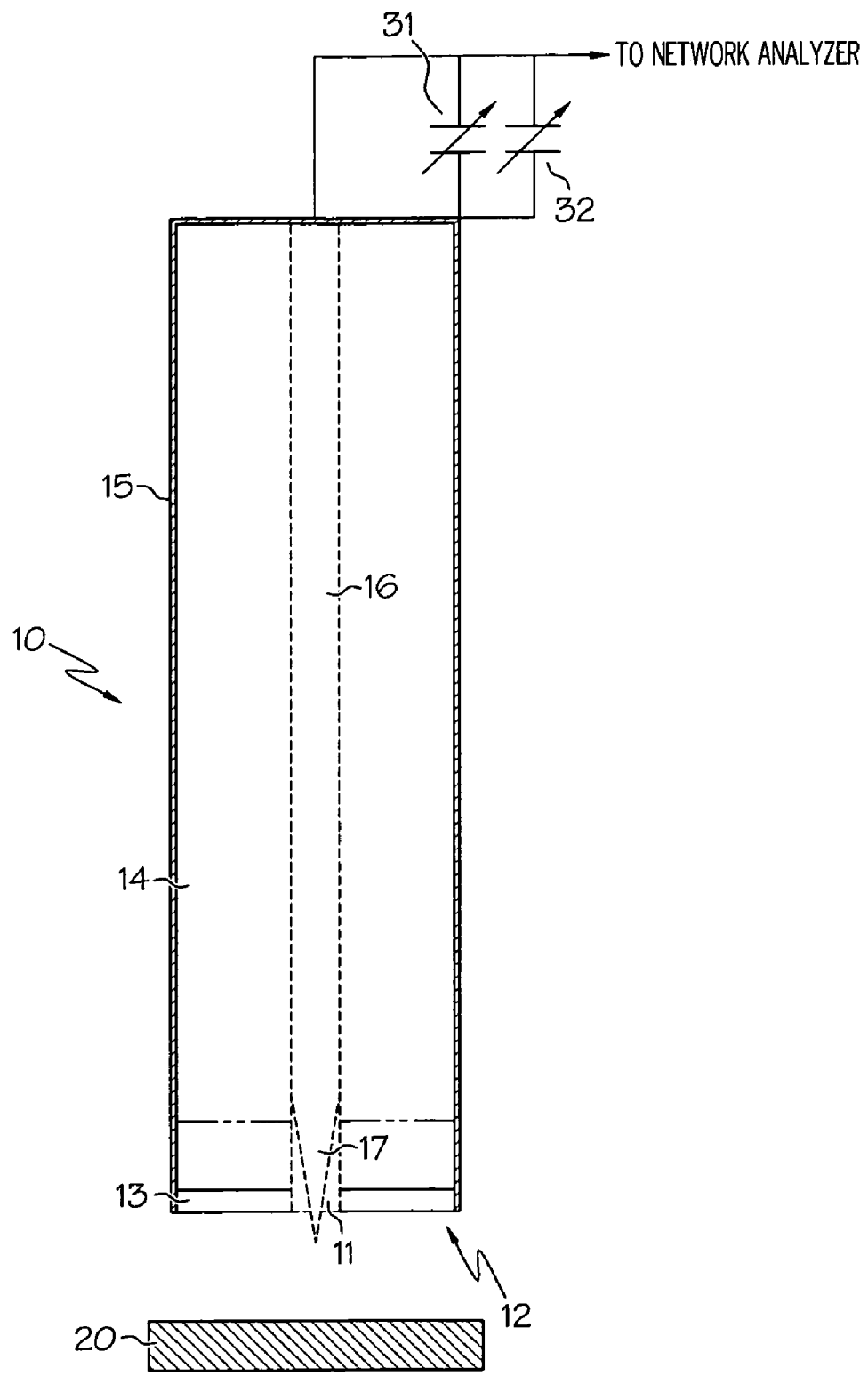
FIG. 3 is a diagram of the probe and coupling network in accordance with one embodiment of the present invention.

Fashioning probe 10 according to the foregoing paragraph results in coaxial wave guide probe 10 rather than an open cavity. As shown in FIGS. 1 and 3, the copper or copper alloy aperture 12 generally is located near the probe tip 17 and is oriented generally perpendicular to the center conductor 16. The aperture 12 comprises a copper or copper alloy plate 13. This copper or copper alloy plate 13, shown in FIGS. 1, 3, and 8, comprises an inside face, an outside face, and a hole 11 that allows the probe tip 17 to be in microwave communication with a sample 20, and a thickness of about 0.010". In addition, the aperture 12 generally is affixed to the outer shield 15, as also shown in FIGS. 1 and 3. In one embodiment, the aperture 12 is soldered inside outer shield 15, creating end-wall aperture 12. Chemically sharpened probe tip 17 is mounted on center conductor 16 and electroplated with silver. The transmission line resonator is then reconstructed by casting the sharpened, plated, center conductor 16 inside the outer shield 15 with high purity paraffin 14. A short section of the original poly(tetrafluoroethylene) shielding replaces paraffin 14 at the sharpened end of the coax, and is located directly above end-wall aperture 12. Poly(tetrafluoroethylene) plug 18 is used to maintain tip-aperture alignment. Sharpened probe tip 17 of center conductor 16 extends beyond shielded end-wall aperture 12 of resonator by approximately 0.001" or less. The purely evanescent probing field resonates from sharpened probe tip 17. In this manner, as the radius of center conductor 16 decreases, the spatial resolution of the probe increases due to localization of the interaction between the probe tip 17 and sample 20.

Figure 8:
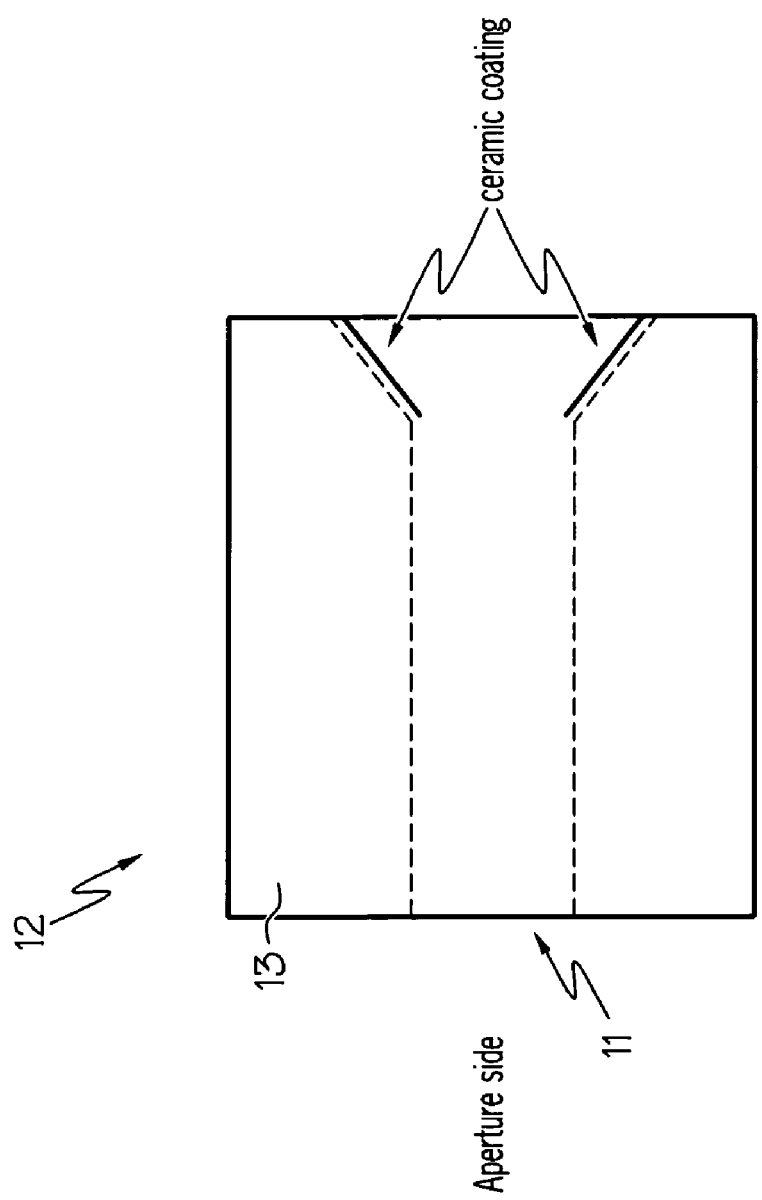
FIG. 8 is a drawing of a chamfered aperture having a ceramic coating in accordance with one embodiment of the present invention.

In an alternative embodiment, poly(tetrafluoroethylene) plug 18, which is disposed at the aperture end, can be replaced with a ceramic, for instance a ceramic coating on the inside face of the copper or copper alloy plate 13, as shown in FIG. 8. Such a coating is applied before aperture 12 is soldered to outer shield 15. In one embodiment this is done using a high temperature strain gauge ceramic adhesive, known by the trade-name Ceramabond-671. In other embodiments, the coating can be formed through pulsed laser deposition of any of a wide variety of suitable ceramics including, without limitation, cerium oxide. In one embodiment, the coated side (i.e., the inside face) of the copper or copper alloy plate 13 is optionally chamfered at about 60° prior to coating. Alternatively, the chamfer can be between about 45° and about 75°. This practice results in an increase in Q and reduced reflection.

Figure 2:
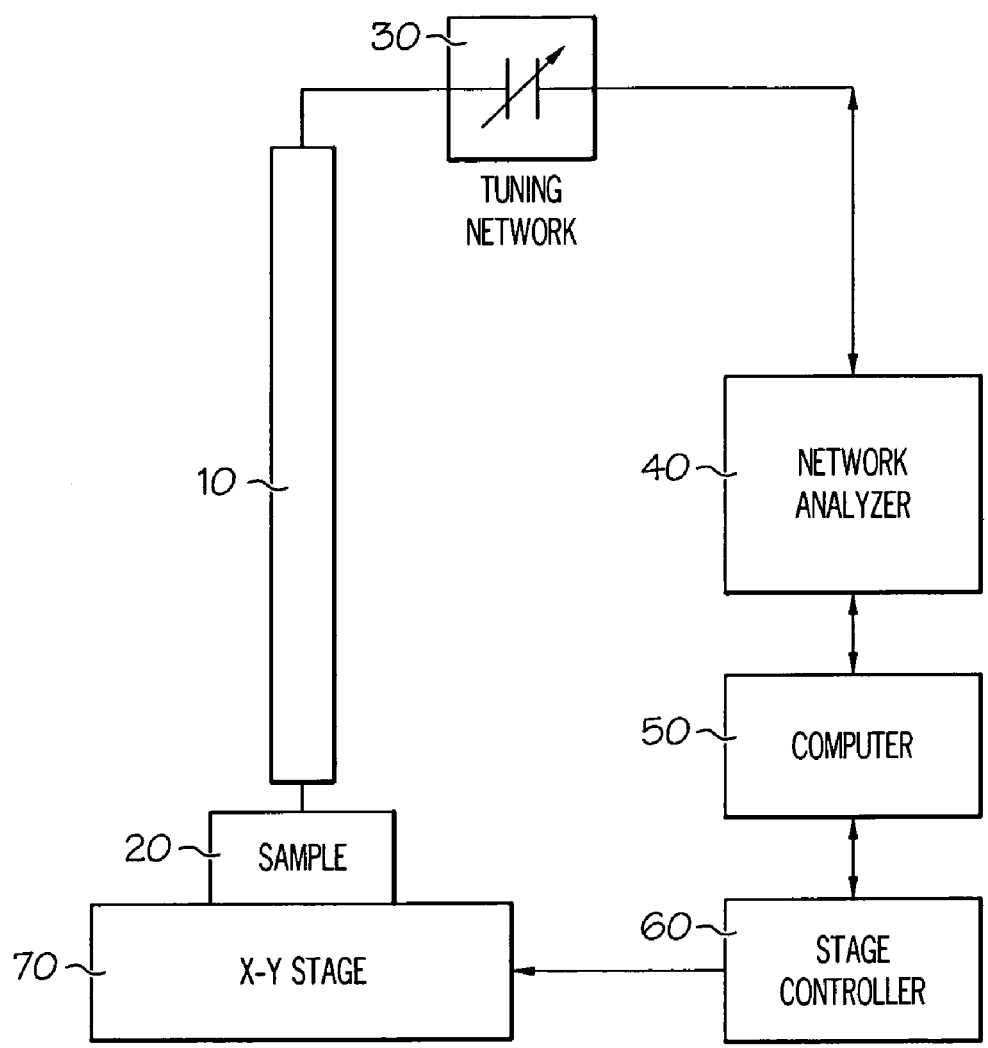
FIG. 2 is a block diagram of a microscope in accordance with one embodiment of the present invention.

Referring to FIG. 2, the microwave excitation frequency of resonant probe 10 can be varied over a bandwidth from about 1 to 40 GHz in network analyzer 40, and is tuned by external capacitors 30. As further illustrated in FIG. 3, microscope probe 10 can be coupled to network analyzer 40 through tuning network capacitors $C_1$ 31 and $C_2$ 32, which are connected to center conductor 16 and to outer shield 15.

A block diagram of the microwave microscopy system is shown in FIG. 2. The changes in the probe's resonant frequency, quality factor (Q), and reflection coefficient are tracked by a Hewlett-Packard 8722ES network analyzer 40 through $S_{11}$ port measurements, as probe 10 moves above sample surface 20. The microwave excitation frequency of resonant probe 10 can be varied within the bandwidth of network analyzer 40 and tuned to critical coupling with tuning assembly 30. Tuning assembly 30 comprises two variable 2.5 to 8 pF capacitors 31, 32. The tuning network has one capacitor $C_1$ 31 connected in-line with center conductor 16, and the other capacitor $C_2$ 32 is connected from center conductor 16 to ground.

The X-Y axis stage 70 is driven by Coherent® optical encoded DC linear actuators. Probe 10 is frame-mounted to a Z-axis linear actuator assembly and the height at which probe 10 is above sample surface 20 can be precisely set. The X-Y stage actuators, network analyzer 40, and data acquisition and collection are controlled by computer 50. The program that interfaces to the X-Y stage actuators, serial port communications, 8722ES GPIB interface, and data acquisition is written in National Instruments Labview® software. The complete evanescent microwave scanning system may be mounted on a vibration-dampening table.

According to one embodiment of the present invention, external tuning capacitor assembly 30 comprises two thermally compensated sapphire capacitors in a shunt configuration. If a shunt is placed near the end of the resonator then the Q of the resonator will theoretically approach infinity. Sapphire capacitors are advantageous because they exhibit frequency invariance up to approximately 10 GHz. In one embodiment, the capacitors 31, 32 are variable from, for example, about 4.5 to 8.0 Picofarads. The position of capacitors 31, 32 in tuning assembly 30 is optimized to reduce interaction. Shielding techniques can also be employed to limit external interaction and leakage.

As is noted above, the present invention also relates to methodology for investigating the complex permittivity of a material through evanescent microwave technology. More particularly, the methodology taught herein is a scheme for investigating the complex permittivity of a material, independent of its other electrical properties, through evanescent microwave spectroscopy.

The extraction of quantitative data through evanescent microwave microscopy requires a detailed configuration of the field outside the probe-tip region. The solution of this field relates the perturbed signal to the distance between the probe-tip and sample, and physical material properties. In accordance with the present invention, the mode of the field generated at the tip is evanescent. A mixed mode field including evanescent and propagative components impedes quantitative measurements. The propagative wave's contribution to the analytical signal depends on the electrical properties of the sample, and limits resolution.

In analyzing conductors quantitatively the probe tip can be modeled as a conducting sphere and the sample as an ideal conductor. The separation between the tip and sample can be modeled as a capacitor with capacitance $C_C$, resulting in a resonant frequency shift that is proportional to the variation in $C_C$. When a conducting material is placed near the tip electrical interaction therewith causes charge and field redistribution. The method of images can be applied to model this redistribution of the field using a series iteration of two image charges. This variation in tip-sample capacitance results in a detectable shift in resonant frequency of probe 10.

As noted above, the method of images can be applied to quantitatively analyze dielectric materials. Additionally, the probe tip is modeled as a charged conducting sphere with potential $V_0$. When the tip is placed close to a dielectric material the dielectric is polarized by the tip's electric field. This dielectric reaction to the tip causes a redistribution of charge on the tip in order to maintain the equipotential surface of the sphere, and also results in a shift in the probe's frequency. The method of images can be applied to model the field redistribution using a series of three image charges in an iterative process to meet boundary conditions at the tip of probe 10 and dielectric sample surface 20.

In this unified approach, perturbation theory for microwave resonators is applied to the field distribution outside the tip. The expression for the resonant frequency shift due to the presence of a sample material can be written as $$\frac{\Delta f}{f_0} = -\frac{\int_V [(\Delta\varepsilon)(\overline{E} \cdot \overline{E}_0) + (\Delta\mu)(\overline{H} \cdot \overline{H}_0)]dV}{\int_V (\varepsilon_0 \overline{E}_0^2 + \mu_0 \overline{H}_0^2)dV} = \frac{f - f_0}{f_0}, \quad (1)$$

where $\overline{E}$ and $\overline{H}$ are the perturbed fields, V is the volume of a region outside the resonator tip, f is the resonant frequency and $f_0$ is the reference frequency. The unperturbed field can be obtained by $$E_0(r,z) = \frac{q}{4\pi\varepsilon_0} \frac{[r\hat{r} + (z + a_1' r_0)\hat{z}]}{[r^2 + (z + a_1' r_0)^2]^{3/2}}, \quad |\overline{H}_0| = \sqrt{\frac{\varepsilon_0}{\mu_0}} |\overline{E}_0| \quad (2)$$

where $$a_1' = r_0 + g, \quad (3)$$

and where $r_0$ is the radius of the spherical tip and g is the gap between the tip and surface of sample 20. The potential $V_0$ on the spherical tip is given by $$V_0 = \frac{q}{4\pi\varepsilon_0 r_0}. \quad (4)$$

Figure 4:
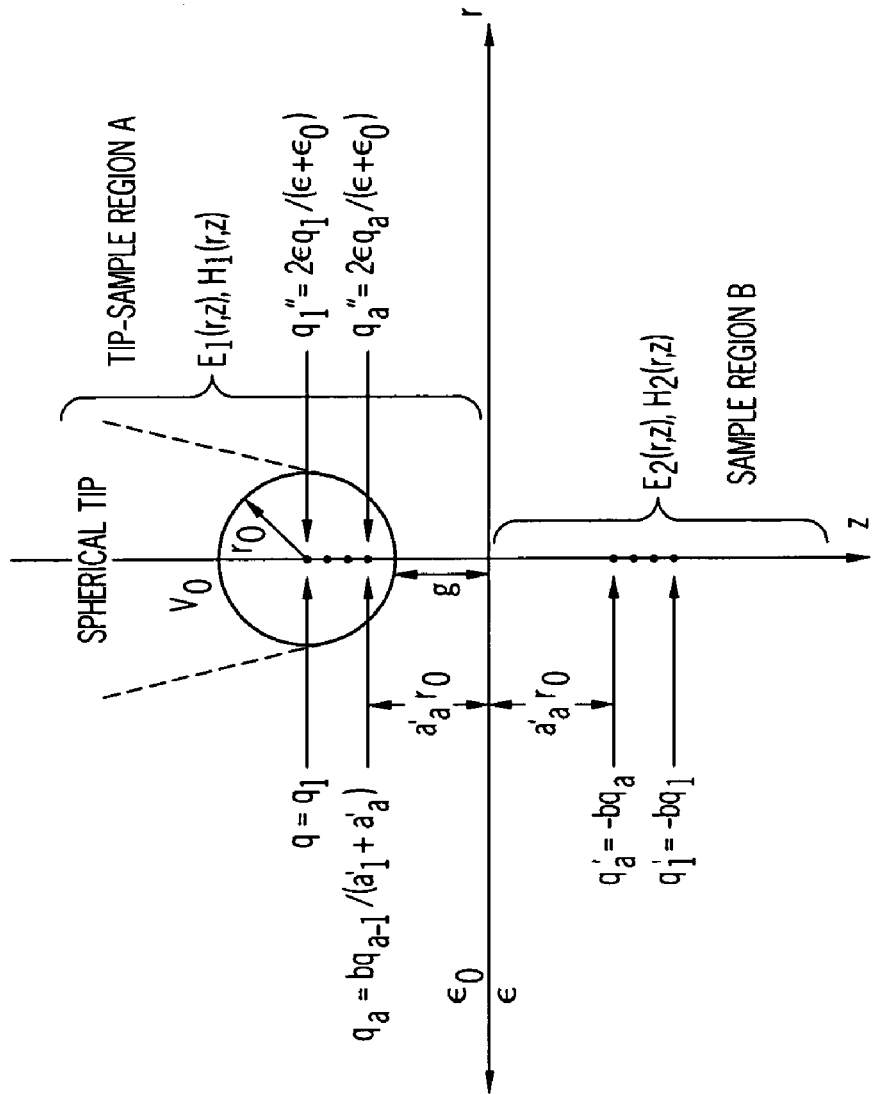
FIG. 4 is a diagram showing a method of images in accordance with one embodiment of the present invention.

By using the method of images (see FIG. 4), the perturbed electric field in the region between the tip and sample, and within the sample volume (assuming $r_0$ is much smaller than the sample thickness) can be modeled as $$\bar{E}_1(r,z) = \frac{q}{4\pi\varepsilon_0} \sum_{n=1}^{\infty} q_n \left\{ \frac{[\hat{r}\hat{r} + (z + a'_n r_0)\hat{z}]}{[r^2 + (z + a'_n r_0)^2]^{3/2}} - b\frac{[\hat{r}\hat{r} + (z - a'_n r_0)\hat{z}]}{[r^2 + (z - a'_n r_0)^2]^{3/2}} \right\}, \quad (5)$$

$$|\bar{H}_1| = \sqrt{\frac{\varepsilon_0}{\mu_0}} |\bar{E}_1|,$$

$$\bar{E}_2(r,z) = \frac{q}{2\pi(\varepsilon + \varepsilon_0)} \sum_{n=1}^{\infty} q_n \frac{[\hat{r}\hat{r} + (z + a'_n r_0)\hat{z}]}{[r^2 + (z + a'_n r_0)^2]^{3/2}}, \quad |\bar{H}_2| = \sqrt{\frac{\varepsilon}{\mu}}|\bar{E}_2|, \quad (6)$$

where μ is real and $$a'_n = a'_1 - \frac{1}{a'_1 + a'_{n-1}}, \quad q_n = t_n q, \quad t_n = \frac{bt_{n-1}}{a'_1 + a'_{n-1}}, \quad (7)$$

$$t_1 = 1, \quad b = \frac{\varepsilon - \varepsilon_0}{\varepsilon + \varepsilon_0}, \quad \varepsilon = \varepsilon' + i\varepsilon''.$$

Importantly, for a tip in free space $\varepsilon = \varepsilon_0$ and $\mu = \mu_0$ at the location r=0 and z=−g−$r_0$, $\bar{E}_0 = \bar{E}_1 = \bar{E}_2$ and $\bar{H}_0 = \bar{H}_1 = \bar{H}_2$, confirming the asymptotic behavior in equations (2), (5), and (6). By integrating the unperturbed electric field in equation (2) and the perturbed electric fields in equations (5) and (6) over a region V outside the spherical tip the frequency shift of equation (1) becomes $$\left(\frac{\Delta f}{f_0}\right)_{TOTAL} = \left(\frac{\Delta f}{f_0}\right)_1 + \left(\frac{\Delta f}{f_0}\right)_2 - A\sum_{n=1}^{\infty} t_n \left\{1 - \frac{1}{2}(1-b)\frac{1}{a'_1 + a'_{n-1}}\right\} - \quad (8)$$

$$A\left(\frac{\Delta\mu}{\Delta\varepsilon}\right)\sqrt{\frac{\varepsilon}{\mu}}\sqrt{\frac{\varepsilon_0}{\mu_0}}\sum_{n=1}^{\infty} t_n \frac{b}{a'_1 + a'_{n-1}}, \quad (A = A'),$$

where $$\left(\frac{\Delta f}{f_0}\right)_1 = -A'\sum_{n=1}^{\infty} t_n \left\{1 - \frac{1}{2}(1-b)\frac{1}{a'_1 + a'_{n-1}}\right\}, \quad \text{Reg. A}, \quad \Delta\mu = 0 \quad (9)$$

and $$\left(\frac{\Delta f}{f_0}\right)_2 = -A\left(1 + \frac{\Delta\mu}{\Delta\varepsilon}\sqrt{\frac{\varepsilon}{\mu}}\sqrt{\frac{\varepsilon_0}{\mu_0}}\right)\sum_{n=1}^{\infty} t_n \frac{b}{a'_1 + a'_{n-1}}, \quad \text{Reg. B}. \quad (10)$$

Parameters A and A' are constants determined by the geometry of the tip-resonator assembly. Taking into account the real part of equation (8), the analytical expression, fits with the experimental data below.

As noted above, prior methods used calculations based on capacitance arising from the gap between a spherical conducting tip and a perfectly conductive sample surface. As a result, such methods do not accurately predict how the probe reacts in the electric field between it and the sample. The method of the present invention overcomes this deficiency. Moreover, the results of the prior art can be reproduced by the present method if the following additional restrictions are imposed on the reaction of the resonator probe to electric fields outside the tip. Namely, the coefficients in equations (9) and (10) must be equal (A'=A). This assumption provides a smooth transition between insulators and ideal conductors by assuming b=1 in equation (8).

In one embodiment the method of the present invention is used to measure the dielectric properties of the superconductor $YBa_2Cu_3O_{7-\delta}$. A superconductor can be treated as a dielectric material with a negative dielectric constant rather than a low loss conductor. In this embodiment probe 10 comprises a tuned, end-wall apertured coaxial transmission line. Resonator probe 10 is coupled to network analyzer 40 through tuning network 30 and coupled to sample 20 (see FIG. 2). When probe tip 17 is in close proximity to sample 20, the resonator's frequency f shifts. In measuring the frequency shift, the resonant frequency reference is set with probe tip 17 at a fixed distance above sample 20. The distance between probe tip 17 and sample 20 is sufficient to assure that the evanescent field emanating from tip 17 will not interact with sample 20. The field dispersion from the probe tip extends outward a short distance with the amplitude of the evanescent field decaying exponentially. As sample 20 enters the near field of probe tip 17 it interacts with the evanescent field, thereby perturbing it. This results in loading the probe 10. Accordingly, sample 20 is considered part of the resonant circuit and results in losses to the system, which decreases the probe's 10 resonant frequency. The measured frequency shift, as it relates to tip-sample separation g, generates a transfer function relating Δf to Δg. The transfer function is best fit with an electrostatic field model using the method of images to extract complex permittivity values.

In one variation of the foregoing embodiment, the evanescent microwave microscopy system is adapted for making cryogenic measurements. A miniature single-stage Joule-Thompson cryogenic system is fixed to X-Y stage 70. Microwave probe 10 is fitted through a bellows, which provides a vacuum seal and allows the probe to move freely over sample 20, which is mounted on a cryogenic finger directly below probe 10.

Figure 5:
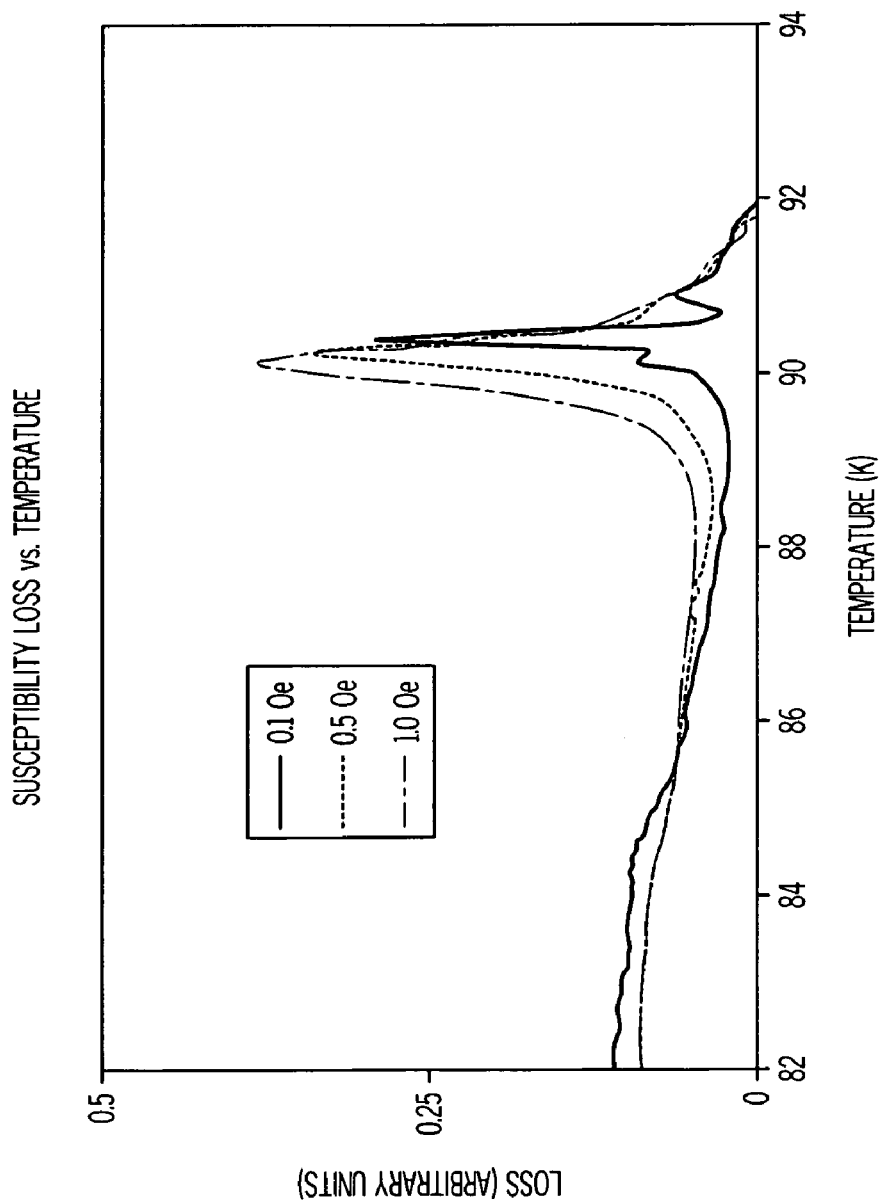
FIG. 5 is a plot of susceptibility loss versus temperature for a superconducting film in accordance with one embodiment of the present invention.
Figure 6:
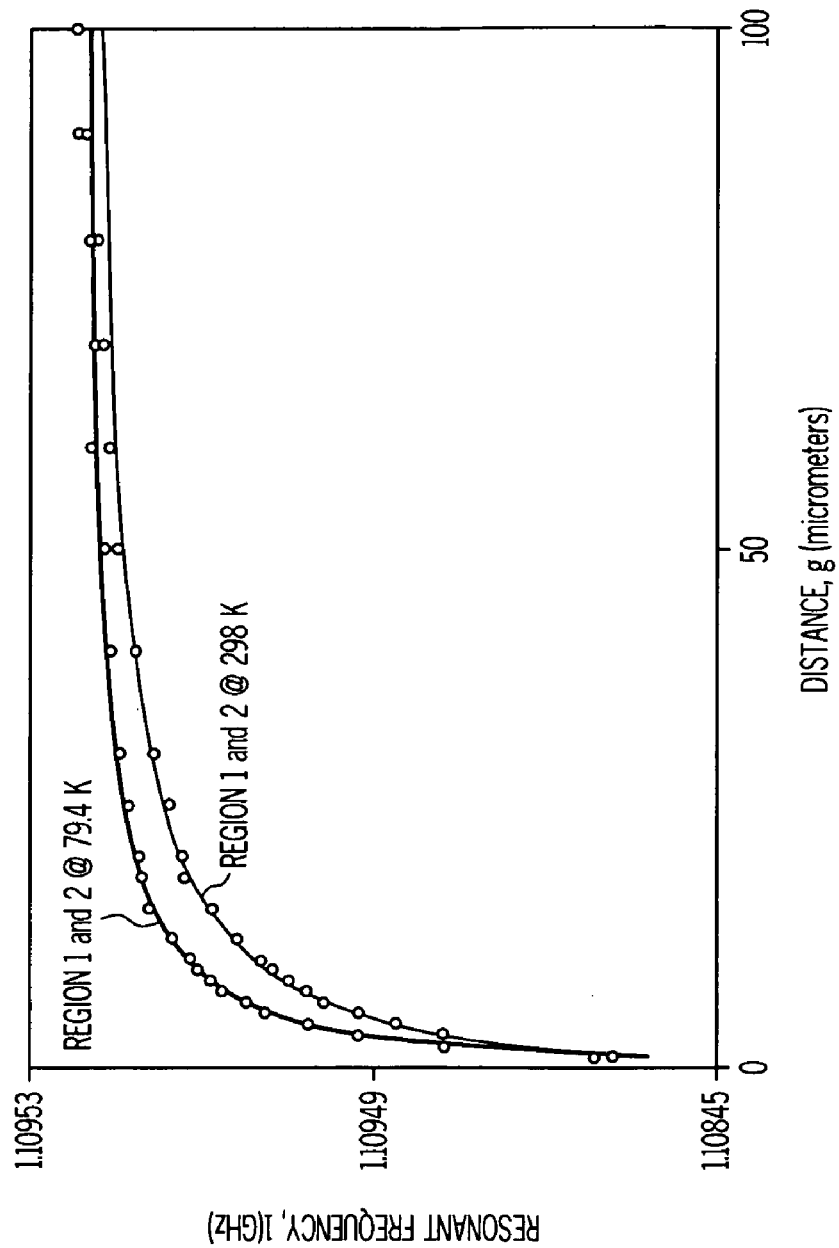
FIG. 6 is a pair of plots of resonant frequency versus distance between the probe tip and the sample in accordance with one embodiment of the present invention.
Figure 7:
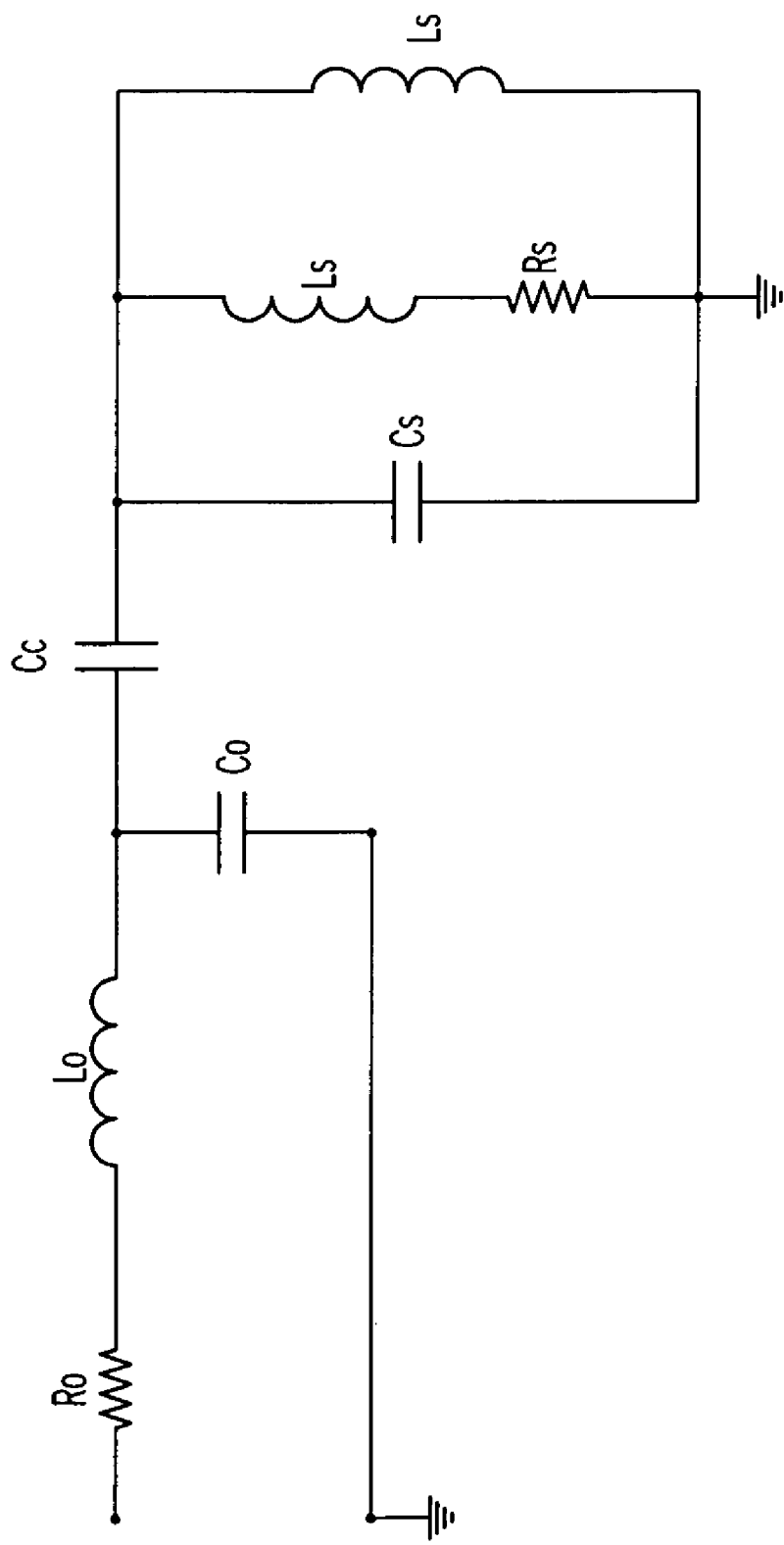
FIG. 7 is a circuit diagram representing a probe connected to a superconductor in accordance with one embodiment of the present invention.

In this embodiment, a $YBa_2Cu_3O_{7-\delta}$ superconducting thin film is fabricated by pulsed laser deposition. This deposition method results in two distinct regions, 1 and 2, forming on a 0.5 mm thick $LaAlO_3$ substrate. The superconductive transition temperatures for region 1 and 2 of the film are $T_c$=92 K and 90 K respectively, which are measured by plotting susceptibility loss versus temperature under different amplitudes of alternating magnetic field at the frequency of 2 MHz, as shown in FIG. 5. The measured frequency shift data is collected for both regions at 79.4 K and 298 K as shown in FIG. 6. Fitting parameters from equation (8) to the experimental data are consolidated in Table I.

TABLE 1

SIMULATION FIT PARAMETERS FOR $YBa_2Cu_3O_{7-\delta}$ SUPERCONDUCTING THIN FILM AT 79.4 K AND 298 K.

| REGIONS | A ($10^{-4}$) | $\varepsilon'/\varepsilon_0$ ($10^8$) | $\varepsilon''/\varepsilon_0$ | $r_0$ ($10^{-6}$ m) | $\mu/\mu_0$ ($10^{-4}$) |
|---|---|---|---|---|---|
| REGION 1 at 79.4 K | 2.09 | −9.2 | −0.1 | 3.35 | 1 |
| REGION 2 at 79.4 K | 2.08 | −9 | −0.1 | 3.35 | 1 |
| TRANSITION REGION at 79.4 K | 2.08 | −9.1 | −0.1 | 3.35 | 1 |

TABLE 1-continued

SIMULATION FIT PARAMETERS FOR YBa$_2$Cu$_3$O$_{7-\delta}$
SUPERCONDUCTING THIN FILM AT 79.4 K AND 298 K.

| REGIONS | A (10$^{-4}$) | $\epsilon'/\epsilon_0$ (10$^8$) | $\epsilon''/\epsilon_0$ | r$_0$ (10$^{-6}$ m) | $\mu/\mu_0$ (10$^{-4}$) |
|---|---|---|---|---|---|
| REGION 1 at 298 K | 1.45 | 1 | 6.6 | 8 | 1 |
| REGION 2 at 298 K | 1.45 | 1 | 6.85 | 8 | 1 |

Above the transition temperature ($T_c$), the superconductor behaves like a metallic conductor. Thus, the sign and magnitude of the real and imaginary permittivity values change (Table I). FIG. 6 shows the curves from both regions below $T_c$ and illustrates that there is a distinct measurable difference between these regions. The transition section connecting regions 1 and 2 with the associated frequency shift fit parameters generated at 79.4 K falls in between fit curves for regions 1 and 2. The model fit parameters for this transition segment are A=2.08×10$^{-4}$, which is the resonator scaling factor, the real component of permittivity $\epsilon'=-9.13\times10^8{}_{\epsilon_0}$, the imaginary component of permittivity $\epsilon''=-0.1_{\epsilon_0}$, and the effective tip radius r$_0$=3.35 μm. For example a change in Q scan performed at 79.4 K over both regions may indicate the average dynamic range of Q in this scan between the two areas to be approximately 8000. The higher Q level is associated with the area of $T_c$=92 K, and the lower Q level corresponds to region of $T_c$=90 K.

The resolution of the probe may be verified using a sapphire polycrystalline substrate with titanium-gold etched lines of widths ranging from about 10 μm to 1 μm. Titanium is used for adhesion of the gold to the substrate, and is approximately 100 nm thick, while the thickness of the gold deposition is approximately 1 μm. The resonant frequency of the probe is tuned to 2.67 GHz. The etched lines of the sample are scanned with the probe resulting in a change in frequency, Q, and magnitude of reflection plots.

The smallest physically resolvable feature for an evanescent probe is governed by the size of the tip radius, along with the height at which the tip is positioned above the feature. For example, to resolve a 5 μm physical feature, the probe tip radius r$_0$ must be approximately 5 μm or less from tip to sample.

The change in Q and change in magnitude of reflection coefficient images may be graphically illustrated. For example data for graphic plots may be taken from a 20 μm×18 μm scan area around a 1 μm wide etched line. The measured tip radius of the probe used may be 1.2 μm with a stand off height (g) of 2 μm and a 1 μm data acquisition step. The location of the etched line may be indicated on each plot by arrows with corresponding measurements in micrometers. In this embodiment, the one micrometer line is distinguishable in both plots, which gives the probe about 1 μm topographical resolution or better. The Q values attainable with this exemplary tunable probe range from 1.5×10$^4$ to well over 10$^5$, and even over 10$^6$. According to this embodiment, the dynamic range of the change in Q is approximately 5×10$^5$.

The Johnson noise-limited sensitivity is analyzed in the present invention by setting the signal power equal to the noise power resulting in [($\delta\epsilon/\epsilon$)]=2.45×10$^{-5}$. As those of ordinary skill in the art are aware, Johnson noise results from random thermal movements of charge carriers, and is often referred to alternatively as thermal noise.

The sensitivity of the evanescent microwave probe described herein can be separated into two categories. The first, $S_r$, is inherent to the resonator itself and directly proportional to it's quiescent operating value Q. The other, $S_f$, is external to the resonator and solely determined by tip-sample interactions. A noise threshold has to be considered in an evanescent microwave system, which also affects sensitivity.

The minimum detectable signal in an evanescent microwave microscopy system should be greater than the noise created by the probe, tuning network, and coupling to the sample. The noise is generated by a resistance at an absolute temperature of T by the random motion of electrons proportional to the temperature T within the resistor. This generates random voltage fluctuations at the resistor terminal, which has a zero average value, but a non-zero rms value given by Planck's black body radiation law. These voltage fluctuations can be calculated by the Raleigh-Jeans approximation as $$V_{n(rms)} = \sqrt{4kTBR}, \quad (11)$$

where k=1.38×10$^{-23}$ J/K is Boltzmann's constant, T is the temperature in Kelvin, B is the bandwidth of the system in Hertz, and R is the resistance in ohms. The resistance that results at critical coupling is the resistance R that produces noise in the system. Therefore, the signal level should be above this noise level in order to be detectable.

The sensitivity approximation internal to the resonator $S_r$ can be determined theoretically and experimentally. The theoretical value is analytically approximated by considering the lumped series equivalent circuit of the resonator, which has an inherent resonant frequency $\omega_0$ and Q associated with the lumped parameters $R_0$, $L_0$, and $C_0$. This configuration and associated parameters can be viewed as if the probe tip is beyond the decay length of the evanescent field from a material, or in free space. If the probe tip is brought into close proximity and electrically couples to the sample, the resonant frequency $\omega_0$ and Q are perturbed to a new value $\omega'_0$ and Q', respectively, and are associated with new perturbed parameters R'$_0$, L'$_0$, and C'$_0$. The total impedance looking into the terminals of the perturbed resonator coupled to a sample can be written as $$Z_{TOTAL} = R'_0\left[1 + jQ\left(\frac{\omega}{\omega'_0} - \frac{\omega'_0}{\omega}\right)\right]. \quad (12)$$

The magnitude of the reflection coefficient $S_{11}$ is related to $Z_{TOTAL}$ by $$S_{11} = \frac{Z_{TOTAL} - Z_0}{Z_{TOTAL} + Z_0}, \quad (13)$$

where $Z_0$ is the characteristic impedance of the resonant structure. If one assumes critical coupling, where the resonator is matched to the characteristic impedance of the feed transmission line at resonant frequency, then R'$_0 \approx Z_0$ at $\omega \approx \omega'_0$ and $S_r$ is defined in as $$S_r = \frac{dS_{11}}{d\omega} \approx \frac{Q'}{\omega'_0}\left(1 - \frac{\Delta\omega}{\omega'_0}\right), \quad (14)$$

where $\Delta\omega = \omega - \omega'_0$.

The external sensitivity determined by tip-sample interaction of probe 10 is based on a λ/4 section of transmission line, with the lumped parameter series equivalent circuit coupled to an equivalent circuit model of a superconductor shown in FIG. 6. The series lumped parameter circuit for the resonator consists of $R_0$, $L_0$, and $C_0$ and the probe tip coupling to the superconductor is represented by $C_C$. The equivalent circuit model of the superconductor is comprised of $R_S$, $L_S$, $C_S$, and $L_C$, where the series combination of $R_S$ and $L_S$ represents the normal conduction. The element $L_C$ signifies the kinetic inductance of the Cooper-pair flow and $C_S$ is related to displacement current. The superconductor equivalent circuit contains the necessary circuit elements in the appropriate configuration to represent not only a superconductor, but a metallic conductor and a dielectric.

The equivalent circuit model for the probe coupled to a superconductor is illustrated in FIG. 6, where the equivalent circuit model for the superconductor is derived from the two-fluid model. The lumped circuit representation of the superconductor comprises capacitance $C_S$, the inductance for normal carrier flow $L_S$, and resistivity $\rho = 1/\sigma_1$, shunted by kinetic inductance $L_C = 1/\omega \sigma_2$. The parameters $C_S$ and $L_S$ are considered to have minimal effects when the superconductor is subjected to low frequencies and is neglected in this analysis. The conductivity ratio $y = \sigma_1/\sigma_2$ is correlated to the impedance ratio $y = \omega L_C/\rho$ and in the limit of large y (y>>1), $\sigma_2 = 0$ and $L_C >> 1$. The opposite extreme, y<<1 results in $L_C$ approaching 0, while $\sigma_2$ advances toward infinity. The superconductive samples for this study were subjected to a frequency of approximately 1 GHz and are of an inductive nature. The superconductor with an inductive nature has $L_C << R_S$.

The impedance $Z_1$ is the parallel combination of $R_S$ and $L_C$ and is represented as $$Z_1 = \frac{j\omega L_C R_S}{R_S + j\omega L_C}. \tag{15}$$

The impedance $Z_2$ is the series combination of $C_C$ and $Z_1$, which results in $$Z_2 = \frac{1}{j\omega C_C} + \frac{j\omega L_C R_S}{R_S + j\omega L_C} = \frac{R_S + j\omega L_C + j\omega C_C(j\omega L_C R_S)}{j\omega C_C(R_S + j\omega L_C)}. \tag{16}$$

The impedance $Z_3$ is the parallel combination of $Z_2$ and $C_0$ given by $$\frac{1}{Z_3} = \frac{1}{Z_2} + j\omega C_0 \tag{17}$$

$$= \frac{j\omega C_C(R_S + j\omega L_C)}{R_S + j\omega L_C + j\omega C_C(j\omega L_C R_S)} + j\omega C_0$$

$$Z_3 = \frac{R_S - \omega^2 L_C C_C R_S + j\omega L_C}{j\omega C_C(R_S + j\omega L_C) + C_0(R_S - \omega^2 L_C C_C R_S + j\omega L_C)}$$

$$= -\frac{j}{\omega}\left[\frac{R_S - \omega^2 L_C C_C R_S + j\omega L_C}{C_C(R_S + j\omega L_C) + C_0(R_S - \omega^2 L_C C_C R_S + j\omega L_C)}\right]$$

$$= -\frac{j}{\omega} Z_3'.$$

The total impedance $Z_{TOTAL}$ looking into the terminals of the probe coupled to a superconductor sample is $$Z_{total} = R_0 + j\omega L_0 - \frac{j}{\omega} Z_3'.$$

The complex impedance $Z_3$ can be represented as $$Z_3 = \frac{1}{j\omega}[Re(Z_3')] = -\frac{j}{\omega}[Re(Z_3')].$$

At resonance, the inductive and capacitive reactances cancel; therefore, $$j\omega L_0 - \frac{j}{\omega}[Re(Z_3')] = 0, \quad \omega^2 L_0 = Re(Z_3'). \tag{18}$$

This allows one to solve for perturbed frequency $\omega$ in terms of the perturbed lumped circuit parameters in an iterative process, where one will be taking a first-order approximation. The combination of equations (7) and (8) results in $$\omega^2 L_0 = \frac{R_S^2(1 - \omega^2 L_C C_C)(C_C + C_0 - \omega^2 C_0 L_C C_C)}{R_S^2(C_C + C_0 - \omega^2 C_0 L_C C_C)^2 + \omega^2 L_C^2(C_C + C_0)^2} \tag{19}$$

$$= \frac{1}{(C_C + C_0)} \frac{\left(1 - \omega^2 L_C C_C - \omega^2 L_C \frac{C_0 C_C}{C_C + C_0}\right)}{\left(1 - 2\omega^2 L_C \frac{C_0 C_C}{C_C + C_0}\right)}$$

$$= \frac{1}{(C_C + C_0)} \frac{1}{\left(1 - 2\omega^2 L_C \frac{C_0 C_C}{C_C + C_0}\right)}$$

$$\left[1 + \omega^2 L_C C_C\left(1 + \frac{C_0}{C_C + C_0}\right)\right]$$

$$= \frac{1}{(C_C + C_0)} \frac{1}{1 + \omega^2 L_C \frac{C_C^2}{C_C + C_0}}.$$

Therefore, for the first iteration, one has the following equation $$\omega_0'^2 = \frac{1}{L_0(C_C + C_0)} \frac{1}{\left[1 + \frac{L_C}{L_0}\left(\frac{C_C}{C_C + C_0}\right)^2\right]}. \tag{20}$$

Solving for $\omega_0'$ in equation (20) results in $$\omega_0' = \omega_0 \frac{1}{\sqrt{1 + \frac{C_C}{C_0}}} \frac{1}{\sqrt{1 + \frac{L_C}{L_0}\left(\frac{C_C}{C_C + C_0}\right)^2}}, \tag{21}$$

where $$\frac{L_C}{L_0} \ll 1.$$

The Taylor expansion of equation (21) gives $$\omega_0' = \omega_0\left(1 - \frac{1}{2}\frac{C_C}{C_0}\right)\left[1 - \frac{1}{2}\frac{L_C}{L_0}\frac{C_C^2}{(C_0 + C_C)^2}\right]. \tag{22}$$

The sensitivity $S_f$ for a superconductor is defined as $$S_f = \frac{g_S R_S^2}{2\pi}\left|\frac{d\omega_0'}{dL_C}\right|, \quad (23)$$

where $$g_S = \frac{A_{\it eff}}{\lambda_L},$$

$A_{\it eff}$ is the effective tip area, and $\lambda_L$ is the London penetration depth. Therefore, the sensitivity $S_f$ for a superconductor is found by taking the derivative of $\omega_0'$ with respect to $L_C$ in equation (22) and is given by $$S_f = \frac{g_S R_S^2}{2\pi}\omega_0\left(1 - \frac{C_C}{2C_0}\right)\left[\frac{1}{(2L_0)}\frac{C_C^2}{(C_C+C_0)^2}\right]. \quad (24)$$

The ability of the probe to differentiate between regions of different conductivity within a superconductor $\Delta\sigma/\sigma$ is defined as $$\frac{\Delta\sigma}{\sigma} = \left(\frac{V_{n(rms)}}{V_{in}}\right) \Big/ S_f S_r \sigma. \quad (25)$$

The probe couples to a metallic sample through the coupling capacitance $C_C$ and the conductor is represented as the series combination of $R_S$ and $L_S$. An equivalent circuit of a metallic sample does not contain the circuit elements $L_C$ and $C_S$ in the two-fluid equivalent circuit. Therefore, $C_S=0$ and $L_C=\infty$. The impedance $Z_1$ is the series combination of $C_C$, $R_S$, and $L_S$ and is represented as $$Z_1 = R_S + j\omega L_S + \frac{1}{j\omega C_C} = \frac{1 + j\omega C_C R_S - \omega^2 L_S C_S}{j\omega C_C}.$$

The parallel combination of $Z_1$ and $C_0$ results in $$\frac{1}{Z_2} = j\omega C_0 + \frac{j\omega C_C}{(1-\omega^2 L_S C_C) + j\omega C_C R_S}$$

$$= \frac{j\omega C_0(1-\omega^2 L_S C_C) + j\omega C_C - \omega^2 C_0 C_C R_S}{(1-\omega^2 L_S C_C) + j\omega C_C R_S}$$

$$= \frac{j\omega[C_C + C_0(1-\omega^2 L_S C_C) - \omega^2 C_0 C_C R_S]}{1-\omega^2 L_S C_C + j\omega C_C R_S},$$

and the impedance $Z_2$ is $$Z_2 = \frac{(1-\omega^2 L_S C_C) + j\omega C_C R_S}{j\omega[C_C C_0(1-\omega^2 L_S C_C) - \omega^2 C_0 C_C R_S]} = -\frac{j}{\omega} Z_2'. \quad (27)$$

The total impedance $Z_{TOTAL}$ looking into the terminals of the probe coupled to a conductor sample is $$Z_{TOTAL} = R_0 + j\omega L_0 - \frac{j}{\omega} Z_2'.$$

The complex impedance $Z_3$ can be represented as $$Z_2 = \frac{1}{j\omega}[Re(Z_2')] = -\frac{j}{\omega}[Re(Z_2')].$$

At resonance, the inductive and capacitive reactance cancel; therefore, $$j\omega L_0 - \frac{j}{\omega}[Re(Z_2')] = 0, \quad \omega^2 L_0 = Re(Z_2'). \quad (28)$$

The impedance $z'_2$ is represented as $$Z_2' = \frac{(1-\omega^2 L_S C_C) + j\omega C_C R_S}{[C_C + C_0(1-\omega^2 L_S C_C) - \omega^2 C_0 C_C R_S]}. \quad (29)$$

Taking the real part of equation (29), we have $$Re(Z_2') = \frac{(1-\omega^2 L_S C_C)[C_C + C_0(1-\omega^2 L_S C_C)] + \omega^2 C_0 C_C^2 R_S^2}{[C_C + C_0(1-\omega^2 L_S C_C)]^2 + \omega^2 C_0 C_C^2 R_S^2} \quad (30)$$

$$= \frac{C_C(1-\omega^2 L_S C_C) + C_0(1-\omega^2 L_S C_C)^2 + \omega^2 C_0 C_C^2 R_S^2}{[C_C + C_0(1-\omega^2 L_S C_C)]^2 + \omega^2 C_0 C_C^2 R_S^2}.$$

The numerator and denominator of equation (30) are considered separately, so the numerator is expanded and results in $$(C_C+C_0)-\omega^2(L_S C_C^2+2C_0 L_S C_C-C_0 C_C^2 R_S^2)+\omega^4 C_0 C_C^2 L_S^2. \quad (31)$$

The $\omega^4$ term in equation (31) is discarded due to insignificance and the denominator of equation (30) is expanded as $$(C_C+C_0-\omega^2 L_S C_C C_0)^2+\omega^2 C_0^2 C_C^2 R_S^2 = (C_C+C_0)^2 - 2\omega^2 L_S(C_C+C_0)C_C C_0+\omega^4 C_0^2 L_S^2+\omega^2 C_0^2 C_C^2 R_S^2. \quad (32)$$

Likewise, the $\omega^4$ term in equation (32) is neglected and the combination of equations (31) and (32) appear as $$\frac{(C_C+C_0)-\omega^2(L_S C_C^2+2C_0 L_S C_C-C_0 C_C^2 R_S^2)}{(C_C+C_0)^2-2\omega^2 L_S(C_C+C_0 L_S)C_0 C_C+\omega^2 C_0^2 C_C^2 R_S^2}. \quad (33)$$

Factoring out $(C_C+C_0)$ in numerator and denominator of equation (33) and substituting the result into equation (28) produces $$\omega^2 L_0 = \frac{1}{(C_C+C_0)} \frac{1 - \omega^2 \frac{(L_S C_C^2 + 2 C_0 L_S C_C^2 - C_0 C_C^2 R_S^2)}{(C_C+C_0)}}{1 - 2\omega^2 \frac{L_S C_C C_0}{(C_C+C_0)} + \omega^2 \frac{C_0^2 C_C^2 R_S^2}{(C_C+C_0)^2}}. \quad (34)$$

Reducing equation (34) and multiplying by $$1 + \omega^2 \frac{[L_S C_C (C_C + 2 C_0) - C_0 C_C^2 R_S^2]}{(C_C+C_0)},$$

results in $$\omega^2 L_0 = \frac{1}{(C_C+C_0)} \frac{1}{1 + \omega^2 \frac{L_S C_C^2}{(C_C+C_0)} + \omega^2 \frac{C_0 C_C^2 R_S^2}{(C_C+C_0)}\left(\frac{C_0}{C_C+C_0} - 1\right)}. \quad (35)$$

The relation $\omega_0^2/(1+C_C/C_0)$ with $\omega_0^2 = 1/L_0 C_0$ as a zero-order approximation to our iterative process is substituted into equation (35) producing a first-order approximation $$\omega_0'^2 = \frac{1}{L_0 (C_C+C_0)} \frac{1}{1 + \frac{L_S}{L_0}\left(\frac{C_C}{C_C+C_0}\right)^2 - \frac{C_0 R_S^2}{L_0}\left(\frac{C_C}{C_C+C_0}\right)^3}. \quad (36)$$

Rewriting equation (36) and taking the square root of both sides and neglecting higher-order terms, we have the first-order approximation for the perturbed resonant frequency due to the coupling of the probe to a conductor.

$$\omega_0' = \omega_0 \frac{1}{\sqrt{1 + \frac{C_C}{C_0}}} \frac{1}{\sqrt{1 + \frac{L_S}{L_0}\left(\frac{C_C}{C_C+C_0}\right)^2}}. \quad (37)$$

The Taylor expansion of equation (37) gives $$\omega_0' = \omega_0 \left(1 - \frac{C_C}{2 C_0}\right)\left[1 - \frac{L_S}{2 L_0} \frac{C_C^2}{(C_C+C_0)^2}\right]. \quad (38)$$

The sensitivity $S_f$ for a conductor is defined as $$S_f = \frac{g_S R_S^2}{2\pi} \left|\frac{d\omega_0'}{d L_S}\right|, \quad (39)$$

where $$g_S = \frac{A_{\mathit{eff}}}{\delta},$$

$A_{\mathit{eff}}$ is the effective tip area, and $\delta$ is the skin depth. Therefore, the sensitivity $S_f$ equation (39) for a conductor is found by taking the derivative of $\omega_0'$ with respect to $L_S$ in equation (38) and results in $$S_f = \frac{g_S R_S^2}{2\pi} \omega_0 \left(1 - \frac{C_C}{2 C_0}\right)\left[\frac{1}{2 L_0} \frac{C_C^2}{(C_C+C_0)^2}\right]. \quad (40)$$

The ability of the probe to differentiate between regions of different conductivity $\Delta\sigma/\sigma$ is defined as $$\frac{\Delta\sigma}{\sigma} = \left(\frac{V_{n(\mathrm{rms})}}{V_{in}}\right) / S_f S_r \sigma, \quad (31)$$

where $v_{n(rms)}$ is given in equation (11) and $v_{in}$ is the probe input voltage.

The probe also couples to a dielectric sample through the coupling capacitance $C_C$ and the dielectric is represented as the parallel combination of $R_S$ and $C_S$. The equivalent circuit of an insulating sample does not contain the circuit elements $L_C$ and $L_S$ from the two-fluid equivalent circuit. Therefore, $L_S = 0$ and $L_C = \infty$. The impedance $Z_1$ is the parallel combination of $R_S$ and $C_S$ and is represented as $$Z_1 = \frac{R_S}{j\omega C_S R_S + 1}. \quad (42)$$

The series combination of $Z_1$ and $C_C$ result in $$Z_2 = \frac{1}{j\omega C_C} + \frac{1}{j\omega C_S R_S + 1} = \frac{1 + j\omega C_S R_S + j\omega C_C R_S}{j\omega C_C (j\omega C_S R_S + 1)} \quad (43)$$

The impedance $Z_3$ is the parallel combination of $Z_2$ and $C_0$ and is represented as $$\frac{1}{Z_3} = \frac{j\omega C_C (1 + j\omega C_S R_S)}{(1 + j\omega C_C R_S + j\omega C_S R_S)} + j\omega C_0, \quad (44)$$

$$Z_3 = \frac{1 + j\omega C_C R_S + j\omega C_S R_S}{j\omega C_C (1 + j\omega C_S R_S) + j\omega C_0 (1 + j\omega C_C R_S + j\omega C_S R_S)}$$

$$= -\frac{j}{\omega} Z_3'.$$

The total impedance $Z_{TOTAL}$ looking into the terminals of the probe coupled to a dielectric sample is $$Z_{TOTAL} = R_0 + j\omega L_0 - \frac{j}{\omega} Z_3'.$$

The complex impedance $Z_3$ can be represented as $$Z_3 = \frac{1}{j\omega}[Re(Z_3')] = -\frac{j}{\omega}[Re(Z_3')].$$

At resonance, the inductive and capacitive reactance cancel; hence, $$j\omega L_0 - \frac{j}{\omega}[Re(Z'_3)] = 0, \quad \omega^2 L_0 = Re(Z'_3). \quad (45)$$

The quantity $j\omega R_S$ is factored out in the numerator and denominator of equation (44) and the result is placed into equation (45), giving $$\omega^2 L_0 = Re\left\{\frac{1 + j\omega R_S(C_C + C_S)}{(C_C + C_0) + j\omega R_S[C_C C_S + C_0(C_C + C_S)]}\right\}$$

$$= \frac{(C_C + C_0) + \omega^2 R_S^2(C_C + C_S)[C_C C_S + C_0(C_C + C_S)]}{(C_C + C_S)^2 + \omega^2 R_S^2[C_C C_S + C_0(C_C + C_S)]^2}.$$

$R_S$ is neglected since it is large, so $$\omega^2 L_0 \approx \frac{(C_C + C_S)}{C_C C_S + C_0(C_C + C_S)} = \frac{1}{C_0}\frac{1}{\left[1 + \frac{C_C C_S}{C_0(C_C + C_S)}\right]}.$$

Therefore, $$\omega_0'^2 = \frac{1}{L_0 C_0}\frac{1}{\left[1 + \frac{C_C C_S}{C_0(C_C + C_S)}\right]}. \quad (46)$$

Solving for $\omega'_0$ in equation (46) results in $$\omega'_0 = \omega_0 \frac{1}{\sqrt{1 + \frac{C_C C_S}{C_0(C_C + C_S)}}}. \quad (47)$$

The Taylor expansion of equation (47) gives $$\omega'_0 = \omega_0\left[1 - \frac{C_C C_S}{2 C_0(C_C + C_S)}\right]. \quad (48)$$

The sensitivity $S_f$ for a dielectric is defined as $$S_f = \frac{g_S}{2\pi}\left|\frac{d\omega'_0}{dC_S}\right|, \quad (49)$$

where $$g_S = \frac{A_{\mathit{eff}}}{\xi_S},$$

$A_{\mathit{eff}}$ is the effective tip area, and $\xi_S$ is the decay length of the evanescent wave, which is approximately 100 μm. Therefore, the sensitivity $S_f$ for a dielectric is found by taking the derivative of $\omega'_0$ with respect to $C_S$ in equation (48)

$$S_f = \frac{g_S \omega_0}{4\pi}\frac{C_C^2}{C_0(C_C + C_S)^2}. \quad (50)$$

The ability of the probe to differentiate between regions of different permittivity $\Delta\epsilon/\epsilon$ is defined as $$\frac{\Delta\varepsilon}{\varepsilon} = \left(\frac{V_{n(rms)}}{V_{in}}\right)\bigg/ S_f S_r \varepsilon. \quad (51)$$

The experimental verification of the sensitivity for superconductors is performed on a $YBa_2Cu_3O_{7-\delta}$ coated $SrTiO_3$ bi-crystal of 6° orientation mismatch. Resonant frequency shift measurements are taken, resulting in complex permittivity values for two separate locations below $T_c$ at 79.4 K. The sensitivities given by equations (14), (24), and (25) are listed in Table II.

TABLE II

SENSITIVITY AND ASSOCIATED PARAMETERS FOR SUPERCONDUCTORS

| | $\epsilon'/\epsilon_0$ ($10^8$) | $S_r$ | $S_f$ | $\Delta\sigma/\sigma$ |
|---|---|---|---|---|
| Position C | −8.94 | $9.03 \times 10^{-6}$ | $1.13 \times 10^{-6}$ | $1.0 \times 10^{-2}$ |
| Position D | −8.87 | $1.04 \times 10^{-5}$ | $1.13 \times 10^{-6}$ | $8.6 \times 10^{-3}$ |

The sensitivity parameters comprise $C_C=1.36\times10^{-15}$ F, $C_0=8.91\times10^{-12}$ F, $L_0=2.03\times10^{-8}$ H, $R_S=1\times10^{-6}$ Ω, $\sigma=3.3\times10^8$ S/m, and $g_s=1.02\times10^{-3}$. The experimental results show that $\Delta\sigma/\sigma \cong 7.8\times10^{-3}$.

The experimental verification of the sensitivity for conductors is also performed on the $YBa_2Cu_3O_{7-\delta}$ coated $SrTiO_3$ bi-crystal of 6° orientation mismatch. The measurements may be taken at the same locations for the superconductor sensitivity, at a temperature of 300 K. The sensitivities given by equations (14), (40), and (41) are listed in Table III. The sensitivity parameters consist of $C_C=1.36\times10^{-15}$ F, $C_0=8.91\times10^{-12}$ F, $L_0=2.03\times10^{-8}$ H, $R_S=7.76\times10^{-4}$ Ω[8], $\sigma=1.28\times10^3$ S/m, and $g_c=1.54\times10^{-4}$. The experimental results have shown that $\Delta\sigma/\sigma \cong 2.4\times10^{-2}$.

TABLE III

SENSITIVITY AND ASSOCIATED PARAMETERS FOR CONDUCTORS

| | $\epsilon'/\epsilon_0$ | $S_r$ | $S_f$ | $\Delta\sigma/\sigma$ |
|---|---|---|---|---|
| Position C | 6.3 | $6.83 \times 10^{-6}$ | $5.9 \times 10^{-2}$ | $8.36 \times 10^{-2}$ |
| Position D | 6.15 | $5.95 \times 10^{-6}$ | $5.9 \times 10^{-2}$ | $9.91 \times 10^{-2}$ |

The experimental verification of the sensitivity for dielectrics is performed on single crystal $SrTiO_3$ utilizing the ferroelectric dependence on temperature property of the material, i.e., $\epsilon_r=f(T)$. In one exemplary embodiment, the probe tip is set to a 1 μm distance above the sample and tuned to a resonant frequency of 1.114787 GHz at a temperature of 300 K. The temperature is raised in 0.2 K increments until the resonance shifted in frequency to 1.114792 GHz at 302 K due to the change in dielectric constant. The change in dielectric constant is determined using the Curie-Weiss law and results in $\Delta\epsilon/\epsilon \cong 6.23\times10^{-3}$. The sensitivity parameters consist of $\epsilon/\epsilon_0=320.8$, $C^C=1.36\times10^{-15}$ F, $C_0=8.91\times10^{-12}$ F, $C_S=4.37\times$ $10^{-15}$ F, and $g_s=1.54\times10^{-6}$. The lowest theoretically estimated change in permittivity that can be detected by the sensor was $\Delta\in/\in=5.75\times10^{-4}$.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. Accordingly, all variations of the present invention that would readily occur to one of ordinary skill in the art are contemplated to be within the scope of the present invention. Thus, the present invention is not to be limited to the examples and embodiments set forth herein. Rather, the claims alone shall set for the metes and bounds of the present invention.

We claim:

1. An evanescent microwave microscopy probe, comprising:
    a center conductor comprising a first end and a second end, wherein the center conductor comprises a waveguide for microwave radiation;
    a probe tip affixed to the first end of the center conductor, wherein the probe tip is capable of acquiring a near-field microwave signal from a sample;
    an outer shield surrounding the center conductor, wherein the center conductor and the outer shield are in a generally coaxial relationship, wherein the outer shield comprises a first end and a second end corresponding to the first and second ends of the center conductor, and wherein the center conductor and the outer shield are not in direct contact such that a gap exists between the center conductor and the outer shield;
    an insulating material occupying at least a portion of the gap between the center conductor and the outer shield;
    an aperture located near the probe tip, wherein:
        the aperture comprises a copper or copper alloy plate, the copper or copper alloy plate comprising a thickness of about 0.010 inches, an inside face, an outside face, and a hole that allows the probe tip to be in microwave communication with a sample, and
        the aperture is oriented generally perpendicular to the center conductor; and
    a tuning network in electronic communication with the second end of the center conductor and with the outer shield, wherein the tuning network comprises a pair of capacitors in a parallel electronic relationship.

2. The probe of claim 1, wherein the insulating material is selected from paraffin, magnesium oxide, titanium oxide, boron nitride, alumina, an organic polymer, or any combination of two or more thereof.

3. The probe of claim 1, wherein the copper or copper alloy plate is affixed to the outer shield with solder.

4. The probe of claim 1, wherein the tuning network further comprises sapphire capacitors.

5. The probe of claim 1, wherein the inside face of the copper or copper alloy plate includes a chamfered surface about the circumference defining the hole.

6. The probe of claim 5, wherein a ceramic coating is disposed on the chamfered surface.

7. An evanescent microwave microscopy probe, comprising:
    a center conductor comprising a first end and a second end, wherein the center conductor comprises a waveguide for microwave radiation;
    a probe tip affixed to the first end of the center conductor, wherein the probe tip is capable of acquiring a near-field microwave signal from a sample;
    an outer shield surrounding the center conductor, wherein the center conductor and the outer shield are in a generally coaxial relationship, wherein the outer shield comprises a first end and a second end corresponding to the first and second ends of the center conductor, and wherein the center conductor and the outer shield are not in direct contact such that a gap exists between the center conductor and the outer shield;
    an insulating material occupying at least a portion of the gap between the center conductor and the outer shield;
    an aperture located near the probe tip, wherein:
        the aperture comprises a plate, the plate comprised substantially of copper, aluminum, brass, alum, and any combinations thereof, the plate comprising a thickness of about 0.010 inches, an inside face, an outside face, and a hole that allows the probe tip to be in microwave communication with a sample, and
        the aperture is oriented generally perpendicular to the center conductor; and
    a tuning network in electronic communication with the second end of the center conductor and with the outer shield, wherein the tuning network comprises a pair of capacitors in a parallel electronic relationship.

8. The probe of claim 7, wherein the insulating material is selected from paraffin, magnesium oxide, titanium oxide, boron nitride, alumina, an organic polymer, or any combination of two or more thereof.

9. The probe of claim 7, wherein the plate is affixed to the outer shield with solder.

10. The probe of claim 7, wherein the inside face of the plate includes a chamfered surface about the circumference defining the hole.

11. The probe of claim 10, wherein a ceramic coating is disposed on the chamfered surface.

12. An evanescent microwave microscopy probe, comprising:
    a center conductor comprising a first end and a second end, wherein the center conductor comprises a waveguide for microwave radiation;
    a probe tip affixed to the first end of the center conductor, wherein the probe tip is capable of acquiring a near-field microwave signal from a sample;
    an outer shield surrounding the center conductor, wherein the center conductor and the outer shield are in a generally coaxial relationship, wherein the outer shield comprises a first end and a second end corresponding to the first and second ends of the center conductor, and wherein the center conductor and the outer shield are not in direct contact such that a gap exists between the center conductor and the outer shield;
    an insulating material occupying at least a portion of the gap between the center conductor and the outer shield;
    an aperture located near the probe tip and oriented generally perpendicular to the center conductor, wherein:
        the aperture comprises a plate, the plate comprising an inside face, an outside face, and a hole that allows the probe tip to be in microwave communication with a sample, the inside face of the plate includes a chamfered surface about the circumference defining the hole of the plate, and a ceramic coating is disposed on the chamfered surface of the inside face of the plate; and a tuning network in electronic communication with the second end of the center conductor and with the outer shield, wherein the tuning network comprises a pair of capacitors in a parallel electronic relationship.

13. The probe of claim 12, wherein the ceramic coating is a high temperature strain gauge ceramic adhesive.

14. The probe of claim 12, wherein the ceramic coating is cerium oxide.

15. The probe of claim 12, wherein the ceramic coating is formed on the inside face of the plate through pulsed laser deposition.

16. The probe of claim 12, wherein the chamfered surface of the inside face of the plate is chamfered at about 60 degrees prior to application of the ceramic coating thereto.

17. The probe of claim 12, wherein the chamfered surface of the inside face of the plate is chamfered between about 45 degrees and about 75 degrees.

18. The probe of claim 12, wherein the plate comprises a thickness of about 0.010 inches.

19. The probe of claim 12, wherein the plate is comprised substantially of copper, aluminum, brass, alum, and any combinations thereof.

20. The probe of claim 12, wherein the plate is a copper or copper alloy plate.

* * * * *

UNITED STATES PATENT AND TRADEMARK OFFICE
CERTIFICATE OF CORRECTION

PATENT NO. : 7,501,833 B2
APPLICATION NO. : 11/484092
DATED : March 10, 2009
INVENTOR(S) : Richard A. Kleismit et al.

It is certified that error appears in the above-identified patent and that said Letters Patent is hereby corrected as shown below:

Col. 7, Line 22 " $\dfrac{q}{2\pi(\varepsilon+\varepsilon_0)}$ " should read -- $\dfrac{1}{2\pi(\varepsilon+\varepsilon_0)}$ --;

Col. 7, Line 35 " $\epsilon = \epsilon_0$ " should read -- $\varepsilon = \varepsilon_0$ --;

Col. 9, Line 47 "For example data" should read --For example, data--;

Col. 9, Line 53 "In this embodiment" should read --In this exemplary embodiment--;

Col. 13, Line 46

" $Z_1 = R_S + j\omega L_S + \dfrac{1}{j\omega C_C} = \dfrac{1 + j\omega C_C R - \omega^2 L_S C_C}{j\omega C_C}$ " should read -- $Z_1 = R_S + j\omega L_S + \dfrac{1}{j\omega C_C} = \dfrac{1 + j\omega C_C R - \omega^2 L_S C_S}{j\omega C_C}$ --;

Col. 14, Line 35

" $\dfrac{(C_C + C_0 - \omega(L_S C_C^2 + 2C_0 L_S C_C - C_0 C_C^2 R_S^2)}{(C_C + C_0)^2 - 2\omega^2 L_S (C_C + C_0 L_S)C_0 C_C + \omega^2 C_0^2 C_C^2 R_S^2}$ " should read -- $\dfrac{(C_C + C_0 - \omega(L_S C_C^2 + 2C_0 L_S C_C - C_0 C_C^2 R_S^2)}{(C_C + C_0)^2 - 2\omega^2 L_S (C_C + C_0)C_0 C_C + \omega^2 C_0^2 C_C^2 R_S^2}$ --;

Signed and Sealed this

Second Day of November, 2010

David J. Kappos
*Director of the United States Patent and Trademark Office*

CERTIFICATE OF CORRECTION (continued)
U.S. Pat. No. 7,501,833 B2

Col. 15, Line 6 " $1-\omega^2 \frac{(L_s C_C^2 + 2C_0 L_S C_C^2 - C_0 C_C^2 R_S^2)}{(C_C + C_0)}$ " should read -- $\frac{(L_s C_C^2 + 2C_0 L_S C_C - C_0 C_C^2 R_S^2)}{(C_C + C_0)}$ --;

Col. 18, Line 43 " $L_0 = 2.03 \times 10^{-8}$ " should read -- $L^0 = 2.03 \times 10^{-8}$ --; and Col. 18, Line 52, Table III should read -- $\epsilon^1 = \epsilon_0 \, (10^8)$ --.